United States Patent [19]

Lemarie

[11] Patent Number: 4,538,826
[45] Date of Patent: Sep. 3, 1985

[54] AID FOR PROPELLING WHEELED VEHICLES

[75] Inventor: Romeo Lemarie, Hong Kong, Hong Kong

[73] Assignee: Paraid Limited, New South Wales, Australia

[21] Appl. No.: 620,609

[22] Filed: Jun. 14, 1984

[30] Foreign Application Priority Data

Jun. 17, 1983 [Aux] Australia .......................... PF 9864

[51] Int. Cl.³ .............................................. B62M 1/16
[52] U.S. Cl. ............................ 280/242 WC; 280/244; 297/DIG. 4
[58] Field of Search ........... 280/242 WC, 242 R, 244, 280/252; 297/DIG. 4

[56] References Cited

U.S. PATENT DOCUMENTS

| | | | |
|---|---|---|---|
| 3,189,368 | 6/1965 | Petersen | 280/242 WC |
| 3,309,110 | 3/1967 | Bulmer | 280/244 |
| 3,623,748 | 11/1971 | Haynes | 280/242 WC |
| 3,877,725 | 4/1975 | Barroza | 280/242 WC |
| 3,994,509 | 11/1976 | Schaeffer | 280/242 WC |

FOREIGN PATENT DOCUMENTS 2642278  3/1978  Fed. Rep. of Germany ...... 280/242 WC

OTHER PUBLICATIONS

European Patent Application No. 23414; Inventor—Shimano, Keizo; published 2/4/81.

Primary Examiner—Joseph F. Peters, Jr.
Assistant Examiner—Everett G. Diederiks, Jr.
Attorney, Agent, or Firm—Townsend and Townsend

[57] ABSTRACT

A device to aid in the propelling of wheelchairs, the device has a pair of arms which are rotatably supported on an axle supporting a wheel of the chair, mounted on the arms is a caliper assembly operated by a handle so that upon manipulation of the handle by an operator, the caliper assembly will engage the wheel to thereby enable an operator to cause rotation of the wheel.

5 Claims, 5 Drawing Figures

AID FOR PROPELLING WHEELED VEHICLES

The present invention relates to wheelchairs and more particularly to apparatus to aid in a user of the chair in propelling the chair.

It is a disadvantage of known wheelchairs that the grip ring provided on each wheel requires the user to reach across the tire of the wheel in order to propel the wheelchair. In wet weather this reaching across the tire results in the arms and clothing of the user becoming soiled due to material coming off the tires as the tires rotate. Additionally, positioning of these grip rings is not advantageous and is not an effective method of propelling a wheelchair.

Devices to aid in the propelling of wheelchairs are described in U.S. Pat. Nos. 3,623,748; 3,994,509; 3,877,725; and 3,189,368; and in French Pat. No. 2 163 307, German Pat. No. 2 642 278, and European Application No. 23414 and Australian Application No. 84386/82. However, each of these devices is either complex or is not easily manipulated by an operator so that a single movement causes gripping of the wheels as well as propulsion thereof. Additionally, they do not allow simple rearward and forward operation of the wheels of the wheelchair.

It is the object of the present invention to overcome or substantially ameliorate the above disadvantages.

There is disclosed herein a wheel propelling device to be mounted adjacent a wheel and engage a peripheral surface thereof to enable rotation of same about a wheel axis, said device comprising a base to be mounted so as to be rotatable about said wheel axis, a caliper assembly mounted on said base and including a pair of opposing caliper members selectively movable into frictional engagement with said peripheral surface, an operator manipulable handle pivotally mounted intermediate its ends on said base, said handle being pivotable about a pivot axis to extend generally parallel to but spaced from said wheel axis, and cam means operatively coupling said handle and caliper members so that upon pivoting of said handle about said pivot axis said caliper members engage said peripheral surface to thereby enable an operator to apply a force to said handle to rotate said wheel.

A preferred form of the present invention will now be described by way of example with reference to the accompanying drawings wherein.

Figure 1:
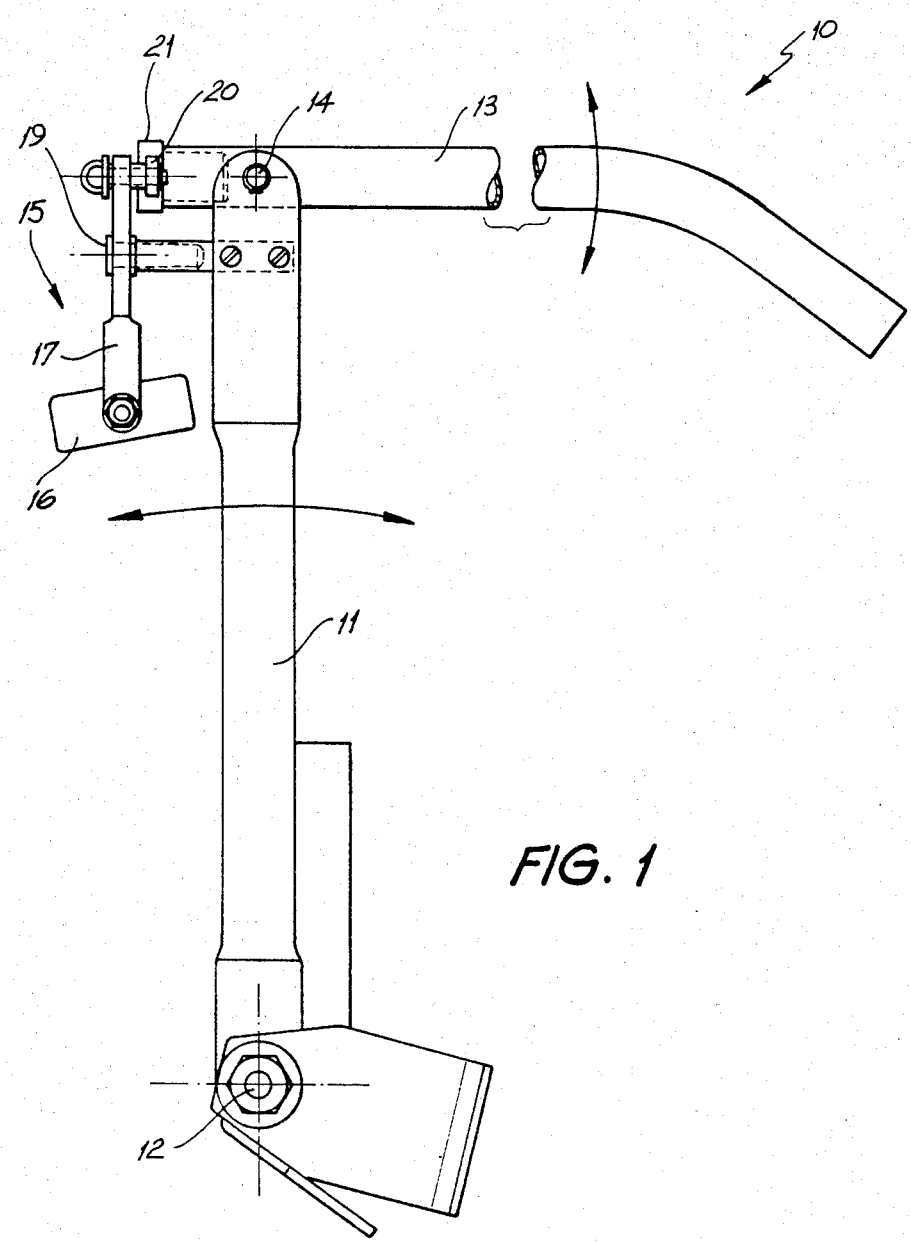
FIG. 1 is a schematic side elevation of a device to aid in propelling wheelchairs.
Figure 2:
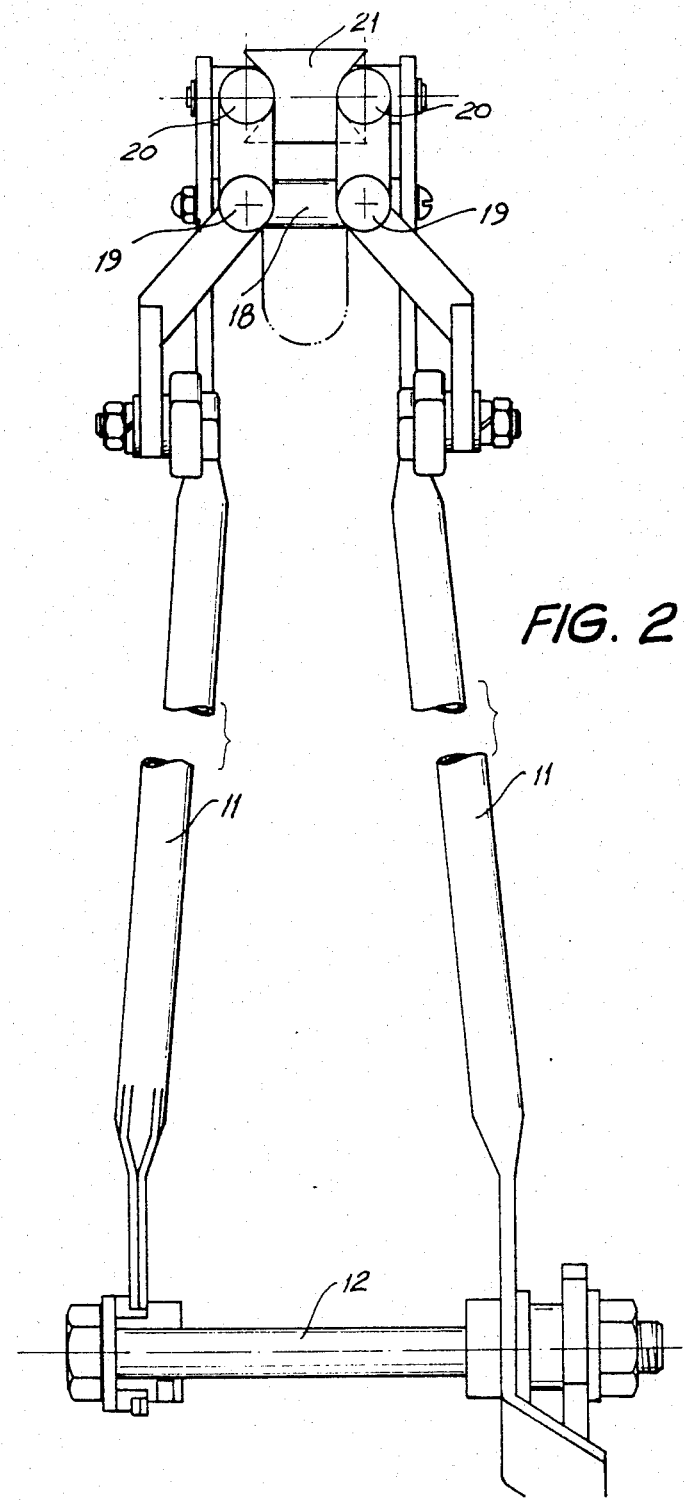
FIG. 2 is a schematic front elevation of the device of FIG. 1.
Figure 3:
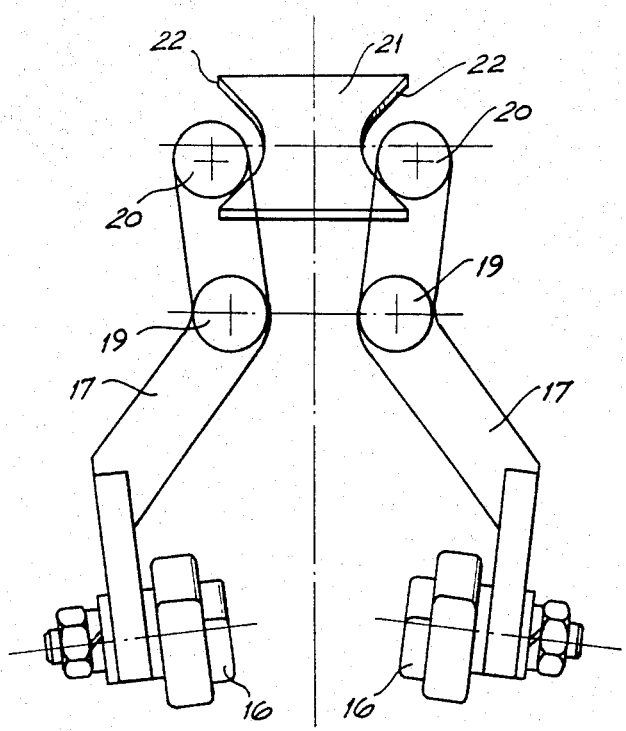
FIG. 3 is a schematic front elevation of a pair of calipers and an actuating member therefor used in the device of FIG. 1.
Figure 4:
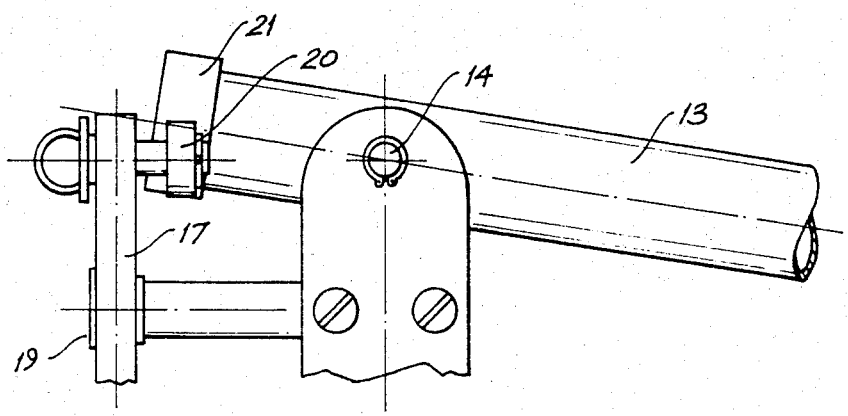
FIG. 4 is a schematic side elevation of the hand grip used in the device of FIG. 1.
Figure 5:
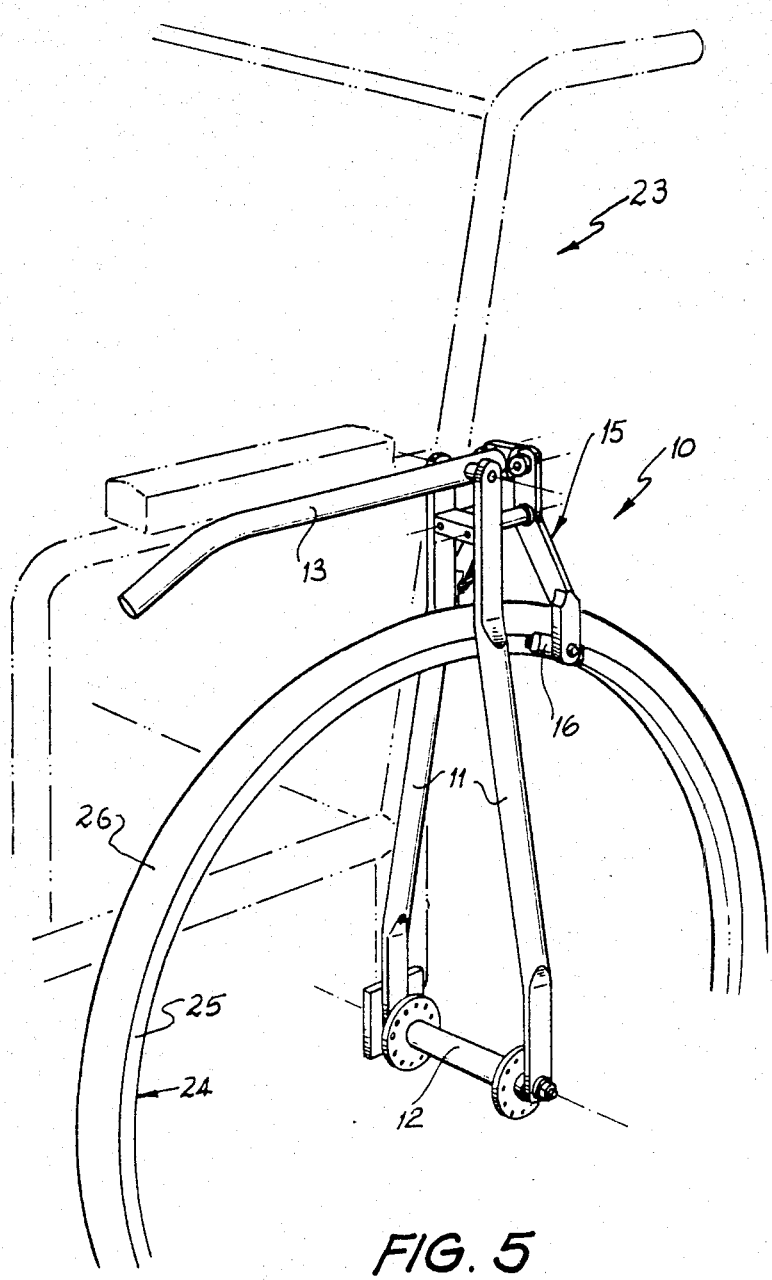
FIG. 5 is a schematic perspective view of a wheelchair equipped with the device of FIG. 1.

In FIG. 5 there is schematically depicted a wheelchair 23 provided with a device 10 to aid in propelling the wheelchair. The wheelchair 23 is conventionally provided with two main rear wheels 24 each having a rim 25 and tire 26 (only one wheel is illustrated). The device 10 is to be mounted on the wheelchair 23 so as to be manipulated by a user in propelling the wheelchair 23. Preferably, each wheel 24 of the wheelchair 23 would be provided with a device 10. The device 10 includes two elongated arms 11 which are pivotally mounted on the axle 12 rotatably supporting the wheel 24. The arms 11 extend generally upwardly from the axle 12 to a position whereby an operator manipulable handle 13 may be easily gripped by a user of the wheelchair 23. The handle 13 is pivotally mounted on the arms 11 by means of a pin 14 which enables pivoting movement of the handle 11 to actuate a caliper assembly 15 positioned to engage the rim 25 (or tire 26) of the wheel 24. The caliper arrangement 15 includes a pair of opposing friction pads 16 which are selectively brought into engagement with the rim 25 by being fixed to a pair of levers 17. The levers 17 are pivotally mounted on a transverse member 18 extending between the arms 11. More particularly pins 19 pivotally attach the levers 17 to the transverse member 18. The upper extremities of the levers 17 are provided with rollers 20 which are positioned to engage a cam member 21. The cam member 21 has two cam faces 22 which engage the two rollers 20 so as to cause pivoting of the levers 17. The cam member 21 is attached to one extremity of the handle 13 so that pivoting movement of the handle 13 causes movement of the cam member 21 and subsequent pivoting movement of the levers 17. It should be noted that the cam surface 22 is generally "U-shaped" in configuration so that either clockwise or anticlockwise pivoting of the handle 13 about the pin 14 will cause engagement of the pads 16 with the rim 25.

In operation of the abovedescribed device 10, a person occupying the wheelchair 23 can propel the wheelchair 23 by engaging the free end of the handle 13. Firstly the user, if wishing to propel the wheelchair forward, need only press downward on the handle 13 to cause actuation of the caliper arrangement 15. This same force applied to the lever 13 will then cause rotation of the wheel 24 via frictional engagement of the pads 16 with the rim 25. If on the other hand the user wishes to propel the wheelchair 23 backward, then all the operator need do is pull up on the lever 23 which will again cause operation of the caliper arrangement 15 and rotation of the wheel 24 in the desired direction.

What I claim is:

1. A wheel propelling device to be mounted adjacent a wheel and engage a peripheral surface thereof to enable rotation of same about a wheel axis, said device comprising a base to be mounted so as to be rotatable about said wheel axis, a caliper assembly mounted on said base and including a pair of opposing caliper members selectively movable into frictional engagement with said peripheral surface, an operator manipulable handle pivotally mounted intermediate its ends on said base, said handle being pivotable about a pivot axis to extend generally parallel to but spaced from said wheel axis, and cam means operatively coupling said handle and caliper members so that upon pivoting of said handle about said pivot axis said caliper members engage said peripheral surface to thereby enable an operator to apply a force to said handle to rotate said wheel.

2. The device of claim 1 wherein said caliper assembly includes a pair of levers pivotally mounted intermediate their ends so as to be pivotable about spaced parallel axes extending normal to said pivot axis, with each lever being provided with one of said caliper members so as to move the caliper members into engagement with said peripheral surface.

3. The device of claim 2 wherein said cam means includes a cam member fixed to an end of said handle, and a cam follower mounted on an end of each lever and engaging said cam member so that upon pivoting of said handle said cam followers cause pivoting of said levers to move said caliper members into engagement with said peripheral surface.

4. The device of claim 3 wherein said cam member has a pair of cam surfaces which are engaged by said cam followers, and each cam surface has a generally "U-shaped" configuration so that clockwise or anti-clockwise pivoting of said handle about said pivot axis will cause engagement of said caliper members with said peripheral surface.

5. The device of an one of claims 1 to 4 wherein said base includes a pair of arms which are to be rotatably supported by an axle supporting said wheel, with said arms being located on opposite sides of said wheel.

* * * * *